US007669807B2

(12) United States Patent
Stigler et al.

(10) Patent No.: US 7,669,807 B2
(45) Date of Patent: Mar. 2, 2010

(54) MOUNTING CLIP

(75) Inventors: Mario Stigler, Schöffengrund (DE); Hans Peter Seng, Reiskirchen (DE)

(73) Assignee: Newfrey LLC, Newark, DE (US)

( * ) Notice: Subject to any disclaimer, the term of this patent is extended or adjusted under 35 U.S.C. 154(b) by 307 days.

(21) Appl. No.: 11/786,153

(22) Filed: Apr. 11, 2007

(65) Prior Publication Data
US 2007/0241256 A1 Oct. 18, 2007

(30) Foreign Application Priority Data
Apr. 13, 2006 (DE) .............. 10 2006 017 878

(51) Int. Cl.
F16B 15/00 (2006.01)
F16B 45/00 (2006.01)
(52) U.S. Cl. ............ 248/71; 248/229.16; 248/231.9; 403/329; 403/397
(58) Field of Classification Search ............ 248/71, 248/229.16, 231.9; 403/329, 397
See application file for complete search history.

(56) References Cited

U.S. PATENT DOCUMENTS

| 3,552,696 | A | * | 1/1971 | Orenick et al. .......... 248/74.3 |
| 3,758,060 | A | * | 9/1973 | Schuplin ................ 248/74.3 |
| 4,739,543 | A | * | 4/1988 | Harris, Jr. ................. 24/297 |
| 4,787,795 | A | * | 11/1988 | Kraus .................... 411/510 |
| 4,840,345 | A | * | 6/1989 | Neil et al. ............... 248/74.2 |
| 4,893,866 | A |   | 1/1990 | Dowd et al. |
| 4,913,484 | A |   | 4/1990 | Dowd et al. |
| 4,981,310 | A | * | 1/1991 | Belisaire ................ 285/140.1 |
| 5,039,040 | A | * | 8/1991 | Idjakiren ................... 248/73 |
| 5,082,323 | A |   | 1/1992 | Dowd et al. |
| 5,161,759 | A |   | 11/1992 | Burns et al. |
| 5,238,427 | A | * | 8/1993 | Fry et al. ................. 439/557 |
| 5,269,060 | A |   | 12/1993 | Dowd et al. |
| 5,271,587 | A |   | 12/1993 | Schäty et al. |
| 5,592,719 | A | * | 1/1997 | Eto et al. .................. 24/453 |
| 5,601,260 | A | * | 2/1997 | Shinohara et al. ......... 248/68.1 |
| 6,203,240 | B1 | * | 3/2001 | Hironaka et al. .......... 403/397 |
| 6,241,198 | B1 |   | 6/2001 | Maruyama |
| 6,481,682 | B2 | * | 11/2002 | Miura .................... 248/231.9 |

(Continued)

FOREIGN PATENT DOCUMENTS

DE 8113637 U1 9/1981

(Continued)

*Primary Examiner*—J. Allen Shriver, II
*Assistant Examiner*—Michael McDuffie
(74) *Attorney, Agent, or Firm*—Harness, Dickey & Pierce, P.L.C.

(57) ABSTRACT

A mounting clip for mounting a component on a supporting part having an aperture includes a head section for attaching the component. A shank section is insertable in the aperture. At least two latching fingers are resiliently held apart from the head section on opposite shank section sides which spread outward toward the head section. At free ends the latching fingers have latching surfaces that rest against a supporting part underside when the mounting clip is inserted in the aperture. The shank section has on one side which extends perpendicular to the sides having the latching fingers, a contact surface that is supported on the aperture inner edge, and has on the side opposite the contact surface an elastically resilient rib or tongue that is supported with a preload against the aperture inner edge after the mounting clip is placed in the aperture.

13 Claims, 3 Drawing Sheets

U.S. PATENT DOCUMENTS

| | | |
|---|---|---|
| 6,565,049 B2 | 5/2003 | Hahn |
| 6,575,681 B2 * | 6/2003 | Kojima et al. ............... 411/508 |
| 6,585,196 B2 | 7/2003 | Nakanishi |
| 6,809,257 B2 | 10/2004 | Shibuya |
| 6,915,990 B2 | 7/2005 | Maruyama |
| 7,011,277 B2 | 3/2006 | Mizukoshi et al. |
| 7,036,775 B2 | 5/2006 | Nakanishi |
| 7,140,070 B2 | 11/2006 | Yuta et al. |
| 7,179,013 B2 * | 2/2007 | Benedetti ................... 403/388 |
| 7,201,352 B2 * | 4/2007 | Kawai ....................... 248/74.1 |
| 7,213,304 B2 | 5/2007 | Lubera et al. |
| 7,278,190 B2 | 10/2007 | Fischer et al. |
| 7,316,374 B2 | 1/2008 | Maruyama |
| 7,387,282 B2 | 6/2008 | Kovac |
| 7,419,206 B2 | 9/2008 | Slobodecki et al. |

FOREIGN PATENT DOCUMENTS

| | | |
|---|---|---|
| GB | 2 316 707 A | 3/1998 |

* cited by examiner

MOUNTING CLIP

CROSS-REFERENCE TO RELATED APPLICATIONS

This application claims the benefit of German Patent Application No. 10 2006 017 878.5, filed Apr. 13, 2006. The disclosure of the above application is incorporated herein by reference.

FIELD

The invention concerns a mounting clip for mounting a component on a supporting part provided with an aperture, comprising a head section for attaching the component, a shank section that can be inserted in the aperture, and at least two latching fingers, which are resiliently held at a distance from the head section on opposite sides of the shank section and which extend outward, at an angle with respect to the clip axis, and toward the head section, and which have, at their free ends, latching surfaces that rest against the underside of the supporting part after the mounting clip has been inserted in the aperture thereof, in order to secure the mounting clip in the aperture in this way.

BACKGROUND

Mounting clips of the specified type are often used in motor vehicles, in order to be able to easily and quickly mount relatively lightweight components, such as cables, pipes, trim elements, and the like. Such mounting clips are generally made of plastic as injection molded parts, with single-piece designs that can be formed with simple molds being preferred for cost reasons. Efforts are also made to design the clips such that they can be reliably mounted in apertures of different sizes, and also in supporting parts of different thicknesses.

A clip of the specified type is known from GB 2,316,707 A. The clip is intended for use in a slot-like aperture, and has a plate-like head section and a shank section composed of a number of parallel posts whose free ends are joined together. Arranged between the posts are latching fingers. The free ends of the latching fingers are curved and have projections extending toward the center of the clip with numerous latching surfaces on their outer surfaces. Depending on the thickness of the supporting part, other latching surfaces of the projections engage with the underside of the supporting part. In this way, the clip adjusts to different material thicknesses of the supporting part. On the underside of the head section, the clip has resilient tabs that bear against the top surface of the supporting part and secure the clip to the supporting part without play. The width of the clip's shank section is narrower than the aperture, so the clip can only be oriented in the transverse direction with the aid of the latching fingers. No information is provided as to how the clip is to be oriented and supported in the longitudinal direction of the aperture.

In addition, from DE 8,113,637 U1 is known a clip with a base part and a flange part, wherein the base part is cylindrical in design and has cylindrical guides on its outer surface that serve to guide the base part in a hole in a supporting part. The base part has two openings in two directions perpendicular to its axis of insertion and to each other, in each of which are provided mutually opposing pairs of elastic tongues which point toward the underside of the flange part and whose spread ends retain the clip on the supporting part once it has been inserted in the hole. In order to compensate for differences in supporting part thickness, multiple pairs of elastic tongues with different lengths are provided. In this prior art clip, the diameter of the cylindrical guides must be matched relatively exactly to the diameter of the hole to make for secure seating in the hole of the supporting part.

SUMMARY

The object of the invention is to further develop a mounting clip of the aforementioned type such that it can be used in both precisely fitting and less precisely fitting apertures in a supporting part, and that guarantees secure seating of the mounting clip without play, even in less precisely fitting apertures. In addition, the mounting clip should be easy and economical to manufacture.

This object is attained by the invention in a mounting clip of the aforementioned type in that the shank section has, on one side extending perpendicular to the sides where the latching fingers are arranged, a contact surface that can be supported on the inner edge of the aperture in the supporting part, and has on the side opposite the contact surface an elastically resilient rib or tongue that can be supported with preloading against the inner edge of the aperture after the mounting clip has been placed in the aperture.

As a result of the inventive design, the mounting clip is supported in the aperture of the supporting part not only by the latching fingers which engage in the aperture and rest against the underside of the supporting part, but also is supported on the supporting part, perpendicular to the direction of action of the latching fingers, by a contact surface on the shank section and an elastic rib or tongue. In this context, the contact surface ensures a defined orientation of the mounting clip in the aperture, while the elastically resilient rib or tongue braces the mounting clip in the aperture, even if the aperture is oversized to a certain extent. In this way, the requirements for manufacturing precision in the production of the aperture in the supporting part can be reduced, and larger manufacturing tolerances can be permitted, without thereby impairing the seating of the mounting clip. Moreover, the aperture can be oversized to a certain extent from the beginning, making it easier to install the mounting clip. In addition, if suitably designed, the mounting clip can be used for multiple aperture sizes, for example slot sizes or round hole sizes.

According to another proposal of the invention, the shank section has two essentially parallel legs, which are joined together by the head section on the one hand, and by at least one connecting web on the other hand, wherein between the legs is an open space in which is arranged the elastically resilient rib or tongue. This design of the mounting clip has the advantage that a simple, two-part mold can be used to manufacture it as an injection molded plastic part. As a result, the mounting clip can be produced very economically.

An advantageous embodiment of the inventive mounting clip can have provision that the elastically resilient rib or tongue is molded on at a side wall of a leg of the shank section and extends toward the other leg, wherein the rib or tongue has a free longitudinal edge next to the other leg and located on the outer side and a distance apart from the lateral terminating plane of the shank section. Depending on the size of the aperture in which the shank section is inserted, the elastically resilient rib or tongue is elastically deformed toward the lateral terminating plane by the edge of the aperture, with the deformation resistance producing an elastic force that presses the free longitudinal edge of the rib or tongue against the edge of the aperture, and its reaction force pressing the contact surface on the opposite side against the edge of the aperture.

If a higher deformation resistance is to be achieved, provision can be made according to another proposal of the invention that the elastically resilient rib joins together two opposing side walls of the leg and has a middle region that is located on the outer side and a distance apart from the lateral terminating plane of the shank section. Preferably the middle region is composed of a convex curvature of the elastically resilient rib. Alternatively, however, it is also possible to provide the elastically resilient rib with an outwardly extending, rib-like projection.

Another advantageous embodiment can consist in that an elastically resilient tongue is molded on a connecting web, which tongue extends toward the head section and has a free end that is adjacent to the head section and is arranged on the outer side and a distance apart from the lateral terminating plane of the shank section. In this embodiment, the elastically resilient tongue has a relatively great length, so that large dimensional deviations can be compensated for with relatively low deformation forces.

In a different embodiment, provision can also be made for the elastically resilient rib to be molded with one end on a connecting web and the other end on the head section, and to have a middle region that is arranged on the outer side and a distance apart from the lateral terminating plane of the shank section. This design permits a higher deformation resistance, but with somewhat reduced tolerance compensation. Here, too, the projecting middle region can be composed of a convex curvature of the tongue.

For attaching a component to the head section, said head section can be provided with various retaining elements, for example a hooked or T-shaped retaining element. Moreover, it is possible to arrange elastic tabs on the head section which comprise a resilient brace for the supporting part and have the effect that the supporting part can be clamped between the elastic tabs resting against the top surface and the latching fingers resting against the underside once the mounting clip has been inserted.

Moreover, provision can be made in accordance with the invention that the latching fingers have multiple latching surfaces arranged one above the other in stepped fashion so that the mounting clip can be used in a supporting part of a different thickness, or also in supporting part arrangements of two or more stacked supporting parts.

DRAWINGS

The invention is explained in detail below on the basis of an example embodiment which is illustrated in the drawings. Shown are:

DETAILED DESCRIPTION

Figure 1:
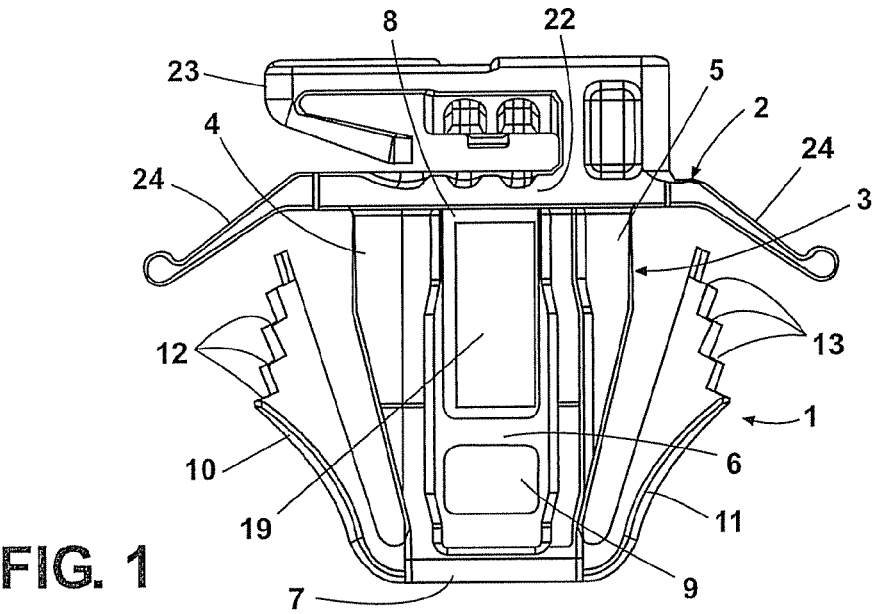
FIG. 1 is a side view of a first example embodiment of a mounting clip according to the invention.
Figure 2:
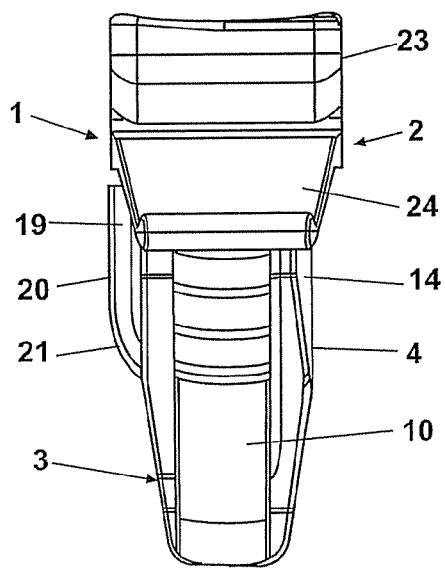
FIG. 2 is a front view of the mounting clip from FIG. 1.
Figure 3:
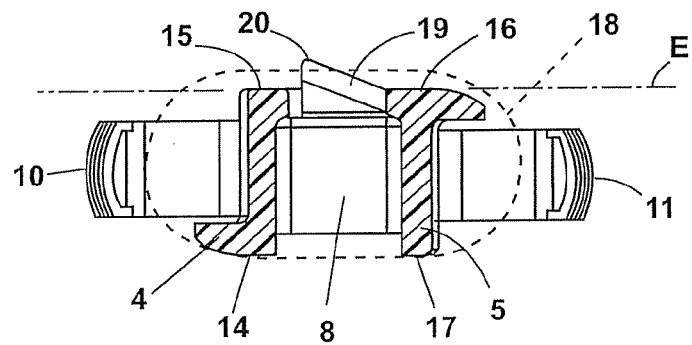
FIG. 3 is a cross-sectional view of the mounting clip from FIG. 1.

The mounting clip 1 shown in FIGS. 1 through 3 is a one-piece plastic part which can be manufactured in the injection molding process using a two-part mold. The mounting clip 1 has a head section 2 and a shank section 3, which is composed of two legs 4, 5, which are essentially parallel to a central clip axis, and connecting webs 6, 7 arranged between said legs. Located between the legs 4, 5 are through-apertures 8, 9, which are separated from one another by the connecting web 6. Arranged at the level of the connecting web 7, on the narrow sides of the shank section 3 facing away from one another, are latching fingers 10, 11, which extend outward at an angle with respect to the clip axis, and extend toward the head section. The mounting ends of the latching fingers 10, 11 are elastically deformable so that the free ends of the latching fingers 10, 11 can be moved until they contact the legs 4, 5. At each of their free ends, the latching fingers 10, 11 have four latching surfaces 12, 13, which ascend one after the other from the outside to the inside in stepped fashion.

With their sides facing the wide side of the shank section 3, the legs 4, 5 constitute contact surfaces 14, 15, 16, 17 that serve to guide and support the shank section 3 in the aperture of a supporting part. The contact surfaces 14, 16 are wider than the contact surfaces 15, 17 and in each case have a region of convex curvature, whose axis of curvature extends in the center plane of the mounting clip and parallel to the clip axis. The shape of the contact surfaces 14, 16 is matched to the contour of an aperture 18, designed as a slot and shown in dashed lines, of a supporting part, for which the mounting clip 1 is primarily intended.

Located between the legs 4, 5 and adjacent to the contact surfaces 15, 16 is an elastically resilient rib 19, which is molded on the leg 5 and with its bottom end on the connecting web 6. The rib 19 has the shape of a flat plate, which extends essentially parallel to the clip axis and is inclined outward at an angle to the terminating plane E defined by the contact surfaces 15, 16 such that its free longitudinal edge 20 is located at a distance from the terminating plane. The bottom end of the plate-like section of the rib 19 is attached to the connecting web 6 by means of an inward-curving transition section 21.

The head section 2 has a flat, plate-like middle part 22, which bears, on its side opposite the shank section 3, a hooked retaining element 23 whose purpose is to suspend a cable tie. Arranged at the face ends of the middle part 22 are elastic tabs 24, which extend outward at an angle of approximately 35° and toward the shank section 3. The free ends of the elastic tabs 24 are thickened into a bead to avoid sharp edges.

For installation, the shank section 2 of the mounting clip 1 is inserted into an aperture of a supporting part. The length and width of the aperture must be dimensioned at least large enough that the legs 4, 5 can enter the aperture without jamming even when imprecisely aligned, which is to say at a certain inclination of the clip axis relative to the center axis of the aperture. In order to ensure this, the aperture has a slight oversize in length and width in comparison to the shank section, which must be accounted for as the minimum size. Contingent upon permissible dimensional variations in the manufacture of the aperture and the manufacture of the shank section, this oversize may also turn out significantly larger. Dimensional differences in the length are compensated for by the resilience of the latching fingers 10, 11, and dimensional differences in the width are compensated for by the rib 19.

During installation of the mounting clip 1, first the latching fingers 10, 11 come into contact, by means of their rounded outer sides, with the edge of the aperture 18 in the supporting part, and are compressed inward toward the legs 4, 5 by said edge. As the shank section 3 penetrates further into the aperture, the longitudinal edge 20 of the rib 19 comes into engagement with the edge of the aperture, first in the transition section 21, and then above it, and is displaced by the edge of the aperture toward its center. As a result, the contact surfaces 14, 17 of the legs 4, 5 rest against the opposite edge of the aperture, so that as the insertion process continues, the rib 19 is elastically deformed inward in the aperture 8 [sic] between the legs 4, 5, while the shank section 3 bears against the edge of the aperture 18 via the contact surfaces 14, 17. When the shank section 3 penetrates further into the aperture 18, the elastic tabs 24 come into contact with the top surface of the supporting part, and two or more (depending on the thickness of the supporting part) of the steps separating the latching surfaces 12, 13, skip over the edge of the aperture. Finally, the mounting clip 1 is pressed firmly against the supporting part counter to the deformation resistance of the elastic tabs 24. After release, it is again moved back opposite the direction of insertion under the action of the elastic tabs 24 until the latching surfaces 12, 13 closest to the underside of the supporting part come into engagement therewith and hold the mounting clip 1 in place.

In the installed position, the mounting clip 1 is securely supported in the aperture of the supporting part, in the longitudinal direction by the latching fingers 10, 11 and in the transverse direction by the contact surfaces 14, 17 and the rib 19; in the direction of the axis of the aperture it is secured to the supporting part by the latching fingers 10, 11 and the elastic tabs 24. In this way, the mounting clip 1 is elastically braced to the supporting part in all spatial directions, and thus is held in a manner that is secure against vibration and free of play.

Figure 4:
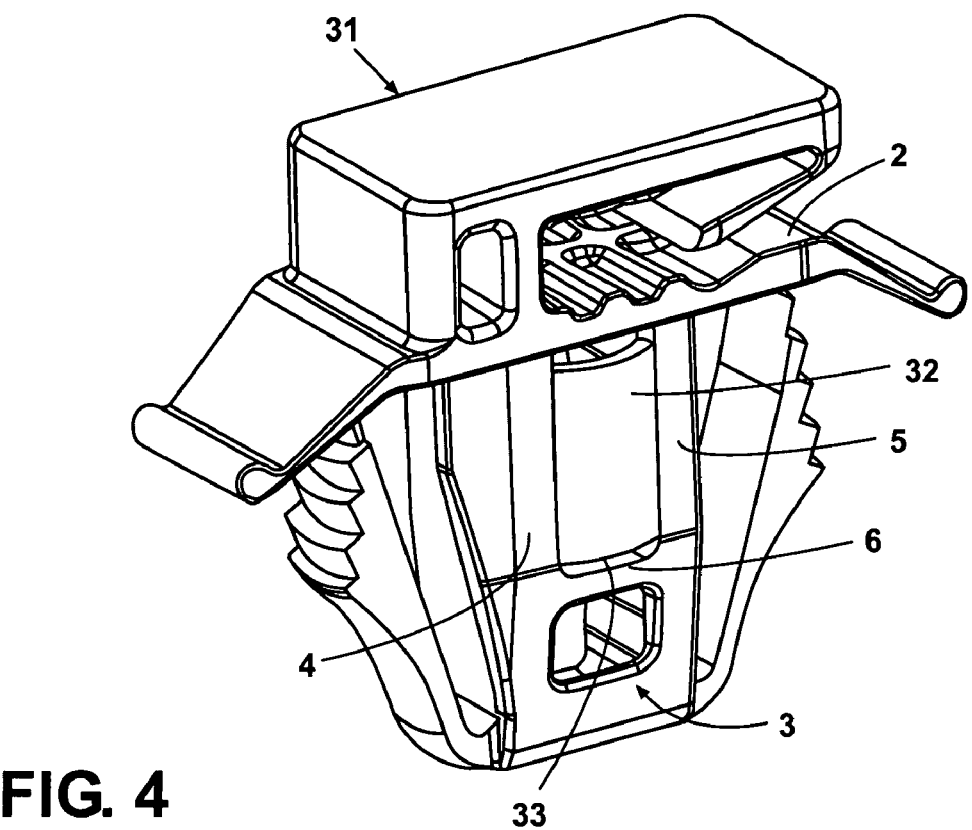
FIG. 4 is a perspective view of a second embodiment of a mounting clip according to the invention.
Figure 5:
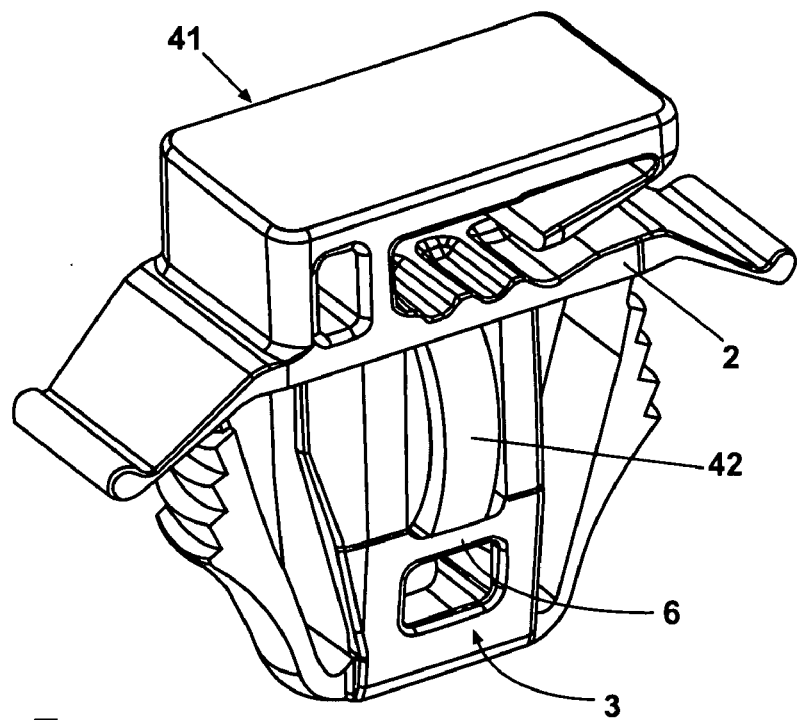
FIG. 5 is a perspective view of a third embodiment of a mounting clip according to the invention.
Figure 6:
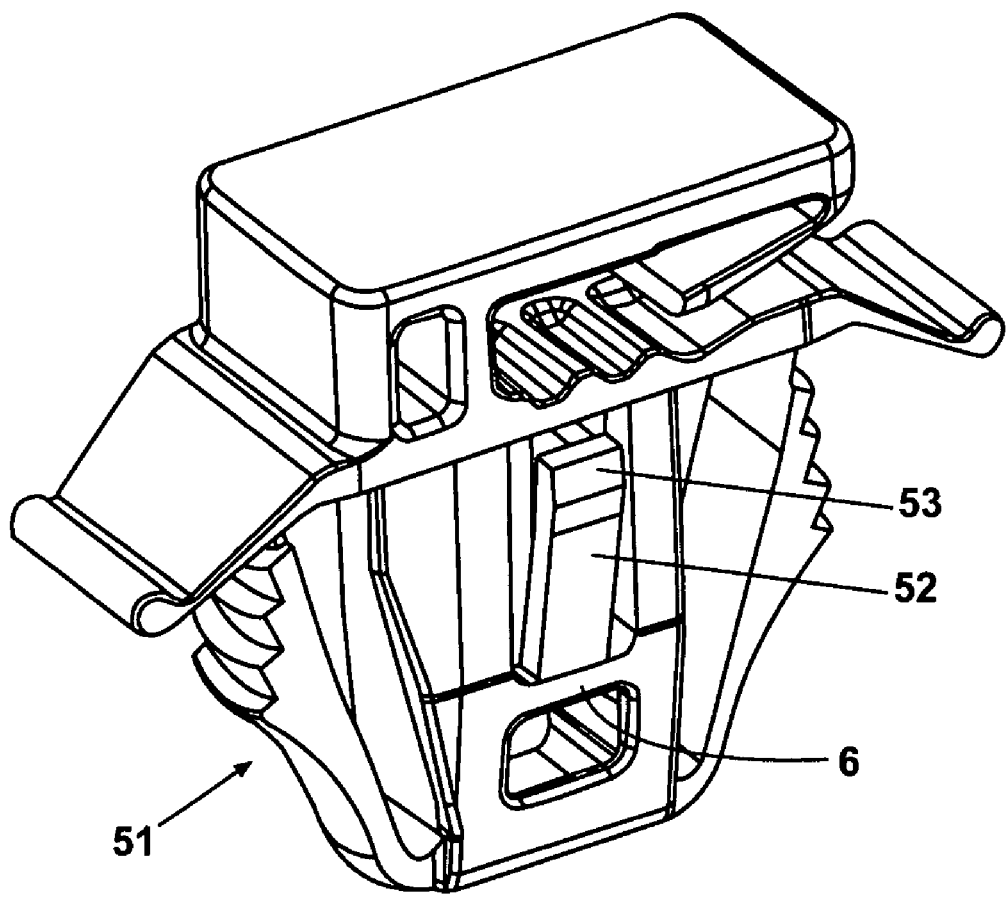
FIG. 6 is a perspective view of a fourth embodiment of a mounting clip according to the invention.

FIGS. 4 through 6 show example embodiments of mounting clips that correspond to the exemplary embodiment described above, with the exception of the design of a rib or tongue corresponding to the rib 19. In the explanation below, therefore, identical reference numbers are used for corresponding parts.

In the example embodiment shown in FIG. 4, a rib 32 is provided that, in addition to being connected to the leg 5, is also connected to the leg 4 of the shank section 3. Moreover, the rib 32 is curved such that its outer surface has an outward-projecting convex curvature whose axis of curvature lies in a plane containing the clip axis. In the lower region of the rib 32 adjacent to the connecting web 6, the curvature is less pronounced or the rib 32 is recessed far enough into the region between the legs 4, 5 that the insertion of the mounting clip 31 is not hindered by the lower edge 33 of the rib 32. The curvature increases toward the top in the direction of the head section 2 so that the middle region of the rib 32 extends further outward there, producing a larger area of deformation. As a result of the connection with the two legs 4, 5, the rib 32 has increased stiffness. This can be used either to achieve higher clamping forces in the aperture of a supporting part or to reduce the wall thickness of the rib 32.

FIG. 5 shows an alternative embodiment of a mounting clip 41, in which an outwardly curved, elastic rib 42 is arranged between the connecting web 6 and the head section 2. Because of its relatively great length and its narrow width, the rib 32 permits a relatively large deformation travel at low deformation forces. In addition, a favorable transition results in the region of the end of the rib 32 attached to the connecting web 6.

FIG. 6 shows an example embodiment of a mounting clip 51 with an elastic tongue 52, which is molded on the connecting web 6 of the shank section 3. The tongue 52 is tilted outward at an angle, so that its free end 53 projects noticeably outward. This design also permits large deformation travel for comparatively little deformation force.

What is claimed is:

1. A mounting clip for mounting a component on a supporting part provided with an aperture, comprising:
   a head section for attaching the component; and
   a shank section insertable in the aperture, the shank section including:
      opposed sides;
      a contact surface positioned on a first side of the shank section extending perpendicular to the opposite sides adapted for latching to the supporting part, the contact surface supportable on an inner edge of the aperture of the supporting part;
      two parallel legs joined together at the head section, and at least one connecting web spaced from the head section;
      an elastically resilient member defining a flat plate connected to one of the opposed sides and further connected to the connecting web by an inward curving transition section, the elastically resilient member positioned at a second side of the shank section opposite the contact surface and having a free longitudinal edge inclined outward from a plane defined by the contact surface elastically engageable with a preload against the inner edge of the aperture when the mounting clip is positioned in the aperture.

2. The mounting clip of claim 1, wherein the shank section comprises an opening between the legs positioned between the head section and the connecting web.

3. The mounting clip of claim 2, wherein the resilient member comprises an elastically resilient rib positioned in the opening.

4. A mounting clip for mounting a component on a supporting part provided with an aperture, comprising:
   a head section for attaching the component;
   a shank section insertable in the aperture, the shank section including:
      opposed sides;
      a contact surface positioned on a first side of the shank section extending perpendicular to the opposite sides adapted for latching to the supporting part, the contact surface supportable on an inner edge of the aperture of the supporting part;
      an elastically resilient member positioned at a second side of the shank section opposite the contact surface and elastically engageable with a preload against the inner edge of the aperture when the mounting clip is positioned in the aperture;
      two parallel legs joined together at the head section, at least one connecting web, and an opening between the legs; and
      the resilient member including an elastically resilient rib positioned in the opening, the elastically resilient rib is homogenously molded at a side wall of one of the legs of the shank section and extends toward the other leg, and
   wherein the elastically resilient rib includes a free longitudinal edge positioned proximate to the other leg and is located in a non-deflected condition on an outer side and a distance apart from a lateral terminating plane defined by the second side of the shank section.

5. The mounting clip according to claim 1, further comprising at least two oppositely positioned latching fingers resiliently held at a distance from the head section each on one of the opposed sides of the shank section and perpendicular to the first and second sides of the shank, the latching fingers extending outward at an angle with respect to a clip axis and toward the head section, the latching fingers having free ends including latching surfaces that contact an underside of the supporting part after the mounting clip has been inserted in the aperture of the supporting part to secure the mounting clip in the aperture.

6. A mounting clip for mounting a component on a supporting part provided with an aperture, comprising:
- a head section for attaching the component;
- a shank section insertable in the aperture;
- at least two oppositely positioned latching fingers resiliently held at a distance from the head section on opposite sides of the shank section, the latching fingers extending outward at an angle with respect to a clip axis and toward the head section, the latching fingers having free ends including latching surfaces that contact an underside of the supporting part after the mounting clip has been inserted in the aperture of the supporting part to secure the mounting clip in the aperture; and
- the shank section including:
  - a contact surface positioned on a first side of the shank section extending perpendicular to the opposite sides having the latching fingers, the contact surface supportable on an inner edge of the aperture of the supporting part; and
  - an elastically resilient member defining a flat plate connected to one of the opposite sides and further connected to a connecting web spaced from the head section by an inward curving transition section, the elastically resilient member positioned at a second side of the shank section opposite the contact surface and elastically engageable with a preload against the inner edge of the aperture when the mounting clip is positioned in the aperture.

7. The mounting clip according to claim 6, wherein the elastically resilient member includes an outwardly extending projection.

8. The mounting clip according to claim 6, further comprising elastic tabs, defining a resilient brace for the supporting part, arranged on the head section.

9. The mounting clip according to claim 6, wherein the latching fingers include multiple latching surfaces arranged one above the other in a stepped fashion.

10. A mounting clip for mounting a component on a supporting part provided with an aperture, comprising:
- a head section for attaching the component;
- a shank section insertable in the aperture, the shank section including:
  - opposed sides;
  - a contact surface positioned on a first side of the shank section extending perpendicular to the opposed sides, the contact surface supportable on an inner edge of the aperture of the supporting part;
  - an elastically resilient member defining a flat plate connected to one of the opposite sides and further connected to a connecting web spaced from the head section by an inward curving transition section, the elastically resilient member positioned at a second side of the shank section opposite the contact surface and elastically engageable with a preload against the inner edge of the aperture when the mounting clip is positioned in the aperture; and
- the head section including:
  - a hooked retaining element operable to releasably retain the component; and
  - opposed elastic tabs having free ends thickened to define a bead.

11. The mounting clip of claim 10, wherein the shank section further comprises two parallel legs joined together at the head section, and first and second connecting webs, defining an opening between the legs.

12. The mounting clip of claim 11, wherein the resilient member comprises an elastically resilient rib positioned in the opening.

13. The mounting clip of claim 10, wherein a shape of the contact surface matches a contour of the supporting part aperture.

* * * * *